United States Patent
Le Huerou et al.

(10) Patent No.: US 10,798,036 B2
(45) Date of Patent: Oct. 6, 2020

(54) METHOD FOR EXCHANGING MULTIMEDIA MESSAGES

(71) Applicant: ORANGE, Paris (FR)

(72) Inventors: Emmanuel Le Huerou, Saint Quay Perros (FR); Eric Beaufils, Langoat (FR); Violaine Mercier, Pleumeur Bodou (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/779,775

(22) PCT Filed: Mar. 21, 2014

(86) PCT No.: PCT/FR2014/050667
§ 371 (c)(1),
(2) Date: Sep. 24, 2015

(87) PCT Pub. No.: WO2014/154979
PCT Pub. Date: Oct. 2, 2014

(65) Prior Publication Data
US 2016/0080297 A1 Mar. 17, 2016

(30) Foreign Application Priority Data
Mar. 25, 2013 (FR) .................................... 13 52681

(51) Int. Cl.
*H04W 4/12* (2009.01)
*H04L 12/58* (2006.01)
(Continued)

(52) U.S. Cl.
CPC ............ *H04L 51/10* (2013.01); *G06F 3/0488* (2013.01); *H04L 12/1813* (2013.01);
(Continued)

(58) Field of Classification Search
CPC ..... H04L 51/10; H04L 51/16; H04L 12/1813; H04L 51/08; G06F 3/0488; H04W 4/12
See application file for complete search history.

(56) References Cited

U.S. PATENT DOCUMENTS 8,832,284 B1 * 9/2014 Owens ................... G06F 3/0481
709/228
2002/0160836 A1 * 10/2002 Watanabe ............... A63F 13/12
463/42
(Continued)

OTHER PUBLICATIONS

French Preliminary Search Report dated Nov. 13, 2013, for International Application No. FR1352681 filed Mar. 25, 2013.
(Continued)

*Primary Examiner* — Chuong A Ngo
(74) *Attorney, Agent, or Firm* — Knobbe, Martens, Olson & Bear, LLP

(57) ABSTRACT

One embodiment disclosed herein relates to a method for exchanging multimedia messages between a first mobile terminal and a second mobile terminal that are connected to a communication network, the method comprising the implementation, by a processor of the first terminal, of a process comprising receiving, from the network, a first multimedia message transmitted by the second terminal, the first multimedia message including at least one media item, restoring and modifying the media item in a user interface depending on the actions of a user, and sending a second multimedia message including the modified media to the second terminal.

7 Claims, 4 Drawing Sheets

(51) Int. Cl.
*H04L 12/18* (2006.01)
*G06F 3/0488* (2013.01)

(52) U.S. Cl.
CPC .............. *H04L 51/08* (2013.01); *H04L 51/16* (2013.01); *H04W 4/12* (2013.01)

(56) References Cited

U.S. PATENT DOCUMENTS

| | | | |
|---|---|---|---|
| 2009/0270115 A1* | 10/2009 | Brun ................. | H04M 1/72555 455/466 |
| 2010/0257539 A1* | 10/2010 | Narayanan .......... | G06F 9/44526 719/311 |
| 2010/0321534 A1* | 12/2010 | Kim ........................ | G06T 11/00 348/239 |
| 2010/0324995 A1* | 12/2010 | Ward ....................... | H04L 51/38 705/14.64 |
| 2011/0041063 A1 | 2/2011 | Lee et al. | |
| 2011/0276901 A1* | 11/2011 | Zambetti ............. | H04L 12/1827 715/753 |
| 2012/0196633 A1* | 8/2012 | Suetsugu ................ | H04L 51/04 455/466 |
| 2016/0241692 A1* | 8/2016 | Wosk ............. | H04M 1/274516 |

OTHER PUBLICATIONS

International Search Report dated May 26, 2014 for International Application No. PCT/FR2014/050667 filed Mar. 21, 2014.

\* cited by examiner

METHOD FOR EXCHANGING MULTIMEDIA MESSAGES

RELATED APPLICATIONS

This application is the U.S. National Phase of Application No. PCT/FR2014/050667 entitled "METHOD FOR EXCHANGING MULTIMEDIA MESSAGES" filed Mar. 21, 2014, which designated the United States, and which claims the benefit of French Application No. 1352681 filed Mar. 25, 2013.

GENERAL TECHNICAL FIELD

The present invention relates to the field of messaging for mobile telephones.

More precisely, it relates to a method of exchange between multimedia message terminals.

PRIOR ART

The MMS ("Multimedia Message Service") is a system allowing the exchange of multimedia messages for mobile telephones. By extension, the abbreviation MMS commonly denotes a multimedia message transmitted via this service.

It extends the capabilities of SMSs, which are limited to 160 characters, and in particular makes it possible to transmit photographs and audio and video recordings.

The strength of the MMS lies in its ability to be used independently of the technology of the network (both 2G and 3G) and the models of the mobile terminals. It is indeed perfectly possible to send MMSs to any terminals, including terminals pre-dating the service: if the terminal of the recipient is not MMS-compatible, the message can generally be accessed on the web, the URL address being indicated in an SMS to be read by the recipient.

It has however been observed that the service has not evolved for over ten years, even if highly evolved smartphones have appeared since then.

It would thus be desirable to make possible an exchange of multimedia messages that is more efficient and quicker, and that takes advantage of the increased capacity of modern smartphones in terms of user-friendliness, and without compromising the strengths of the SMS/MMS in terms of interoperability and robustness (quality of service.)

PRESENTATION OF THE INVENTION

The present invention thus relates to a first aspect of a method for exchanging multimedia messages between a first mobile terminal and a second mobile terminal connected to a communication network, the method comprising the implementation, by a data processing module of the first terminal, of steps of:
  (a) reception from the network of a first multimedia message emitted by the second terminal, the first multimedia message comprising at least one content;
  (b) rendering and modification of said content in a user interface according to the actions of a user;
  (c) sending of a second multimedia message comprising said modified content to the second terminal.

This method makes provision for modifying a content (particularly an image) received by MMS before sending it back to the sender. This innovation makes it possible to dynamize the use of the MMS by allowing an interactive exchange of multimedia contents that is quick, easy and pleasant for users.

In addition, the strengths of the MMS are preserved since a terminal that does not allow the implementation of the present method will receive an MMS thus generated in the same way as any other.

According to other advantageous and non-limiting features:
  said at least one content is an image (images are the contents most commonly sent by MMS, and their processing in the method, for example via a touch-sensitive screen, is particularly easy);
  said user interface allows the display in thread form of the images included in the multimedia messages exchanged between the first and second terminals (this presentation provides the same user-friendliness as that obtained over evolved SMS messaging interfaces)
  the user interface comprises graphics editing tools for implementing step (b), the image being displayed on the user interface in real time while it is being modified (the present method is particularly suitable for images, the integration of graphics editing tools allowing for particularly intuitive and effective use of this type of content);
  said first terminal comprises a touch-sensitive screen for implementing said user interface of the first terminal, said user actions being touch actions (touch-sensitive technology is particularly suitable for the method and increases the interactivity and simplicity of use desired)
  the multimedia message is of Multimedia Message Service (MMS) type (as explained, this is the prevalent standard used nowadays);
  the transmission of multimedia messages over the network can be implemented in accordance with Rich Communication Services (RCS) (RCS specifications define new standards that substantially increase the user experience in terms of comfort, speed etc.)

According to a second aspect, the invention relates to a mobile terminal connected to a second mobile terminal via a communication network, the terminal comprising a data processing module, characterized in that the data processing module is configured to:
  receive from the network a first multimedia message emitted by the second terminal, the first multimedia message comprising at least one content;
  render and modify said content in a user interface according to the actions of a user;
  send to the second terminal a second multimedia message comprising said modified content.

The aim of this terminal is to ensure in a manner transparent to the user the implementation of the method according to the invention, for example through an installed application. This application can replace an existing SMS/MMS application since it offers the same functions, but in a more effective, advanced manner.

Using the user interface of the terminal, the user actions are intuitively transferred to the content to modify it and allow the interactive exchange of MMSs.

According to a third and fourth aspect respectively, the invention relates to a computer program product comprising code instructions for the execution of a method, according to the first aspect of the invention, for exchanging multimedia messages between a first mobile terminal and a second mobile terminal connected to a communication network; and a storage means readable via an item of IT equipment, on which such a computer program product according to the invention is stored.

PRESENTATION OF THE FIGURES

Other features and advantages of the present invention will become apparent on reading the following description of a preferred embodiment. This description is given with reference to the appended drawings wherein.

DETAILED DESCRIPTION

Principle

Figure 1:
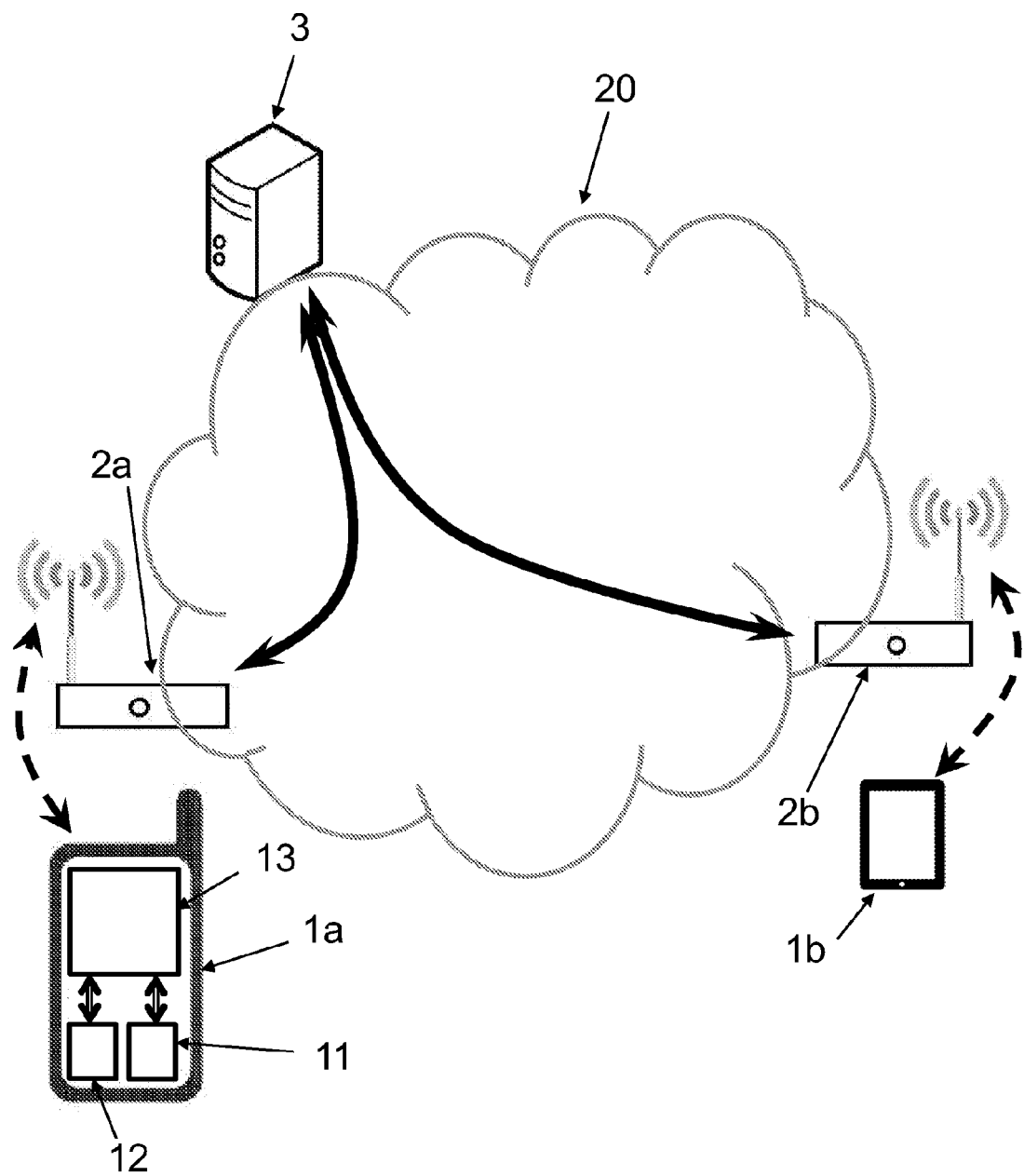
FIG. 1 is a diagram of a network architecture for implementing a preferred embodiment of the method according to the invention.

In connection with FIG. 1, the method according to the invention is a method for exchanging multimedia messages between a first mobile terminal 1a and a second mobile terminal 1b connected to a communication network 20, in particular a mobile telephone network and/or the Internet.

Each terminal 1a, 1b can be any item of nomadic equipment able to connect to the network 20 and supporting the exchanging of multimedia messages, in particular smartphones, touch-sensitive tablets, etc. In the example represented by FIG. 1, the first terminal 1a is a smartphone connected to the network via an antenna 2a, and the second terminal 1b is a touch-sensitive tablet connected to the network 20 via a WiFi terminal 2b.

The terminals 1a, 1b ach comprise a data processing module 11 (a processor) and advantageously a data storage module 12 (flash memory.)

It will be understood that there can be several second terminals 1b if the user of the terminal 1a wishes to send a multimedia message to several recipients at the same time and conduct conversations with more than two participants.

The term "multimedia message" is understood to mean any message "of MMS type", i.e. a message in accordance with a system for emitting and receiving multimedia messages for mobile telephones (3G, 4G or LTE—Long Term Evolution), and capable of transmitting at least one content, i.e. any graphical content (image, photograph, animated gif, video etc.) or any audio content (an audio file), in a network. It will therefore be understood that the invention is not limited to the MMS as known today and that it may apply to evolutions or replacements of the standard.

Note that the MMS message can comprise more than one content, and can combine several types (for example an image and a sound.)

As represented, still in FIG. 1, a server 3 for the storage and routing of multimedia messages is also connected to the network 20.

This server 3 which is in particular a MMSC ("Multimedia Messaging Service Center") server receives any MMS message sent from a terminal connected to the network 20, then determines if the recipient is equipped with a terminal allowing the receipt of MMSs (and if the terminal is currently connected), and where applicable routes the message. Otherwise it is temporarily stored.

Alternatively, the server 3 is advantageously on an RCS (Rich Communication Services) "enabler" server, in other words a server implementing the new standard in accordance with the RCS specifications for the exchange of SMS/MMSs using data transport over IP (Internet Protocol), and not conventional circuits.

It will be understood that the method according to the invention is not limited to any particular method for transporting multimedia messages within the network 20, and can in particular be adapted to future standards.

This method can be distinguished from the existing one in that it comprises the implementation by the data processing module 11 of the first terminal 1a of steps of:

(a) reception from the network 20 of a first multimedia message emitted by the second terminal 1b, the first multimedia message comprising at least one content;

(b) rendering and modification of said content in a user interface I according to the actions of a user;

(c) sending to the second terminal 1b of a second multimedia message comprising said modified content.

In other words, the method forming the subject of the invention makes provision for an exchange of MMSs between the first and second terminals 1a, 1b wherein the user can modify a received content, and retransmit it.

In the remainder of the present description, the example will be used wherein the content is an image (the rendering is then a display), but those skilled in the art will be able to transpose the invention described to any other content or combination of media.

Specifically, conventionally, when a user has received an image by MMS, he or she can continue the conversation either by sending back another image, or by modifying that received via a specific image editing application of the terminal, then sending it back.

The second option is long and complicated, and is thus not used: once the image is received it would be necessary to store it on the data storage module 12 of the terminal 1a, launch the editing application and implement the modification send the modified image again, and finally load the latter from the dedicated MMS-sending application.

The present method makes provision for the user, on receiving the image of the MMS message, to be able to modify it at the same time as he or she is viewing it, for an intuitive and quick exchange.

It should be noted that if the second terminal 1b possesses a data processing module 11 configured in a similar manner, it can in turn remodify the image and second it back in order to continue the exchange in an easy and pleasant manner.

If it only possesses a conventional MMS-management application, the recipient receives the multimedia message including the modified image like any other MMS message, hence total interoperability.

User Interface

Figure 2A:
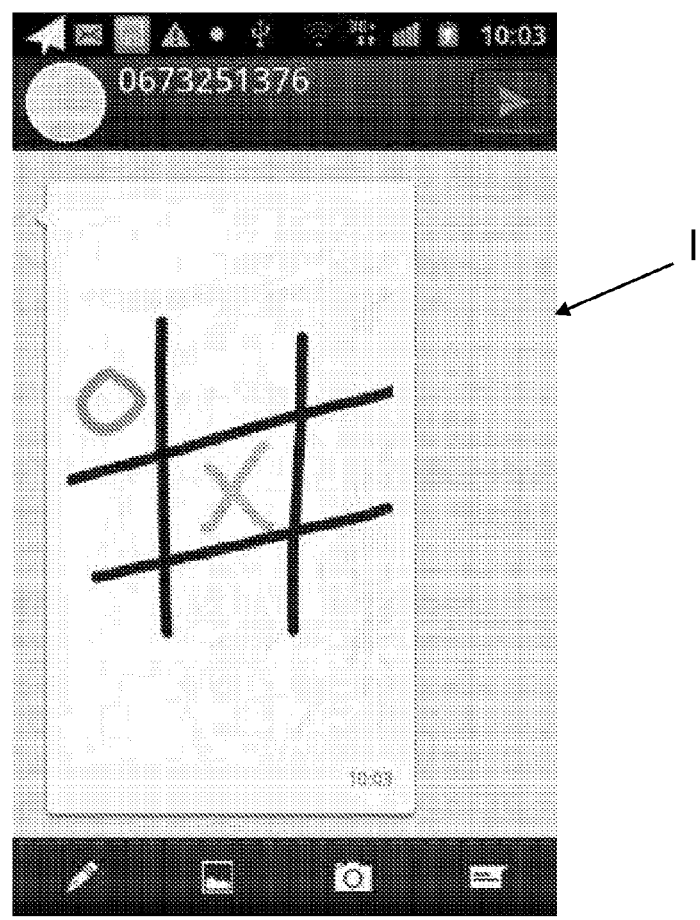
FIGS. 2a-2c are three screen captures of a mobile terminal illustrating the implementation of an embodiment of the method according to the invention.
Figure 2B:
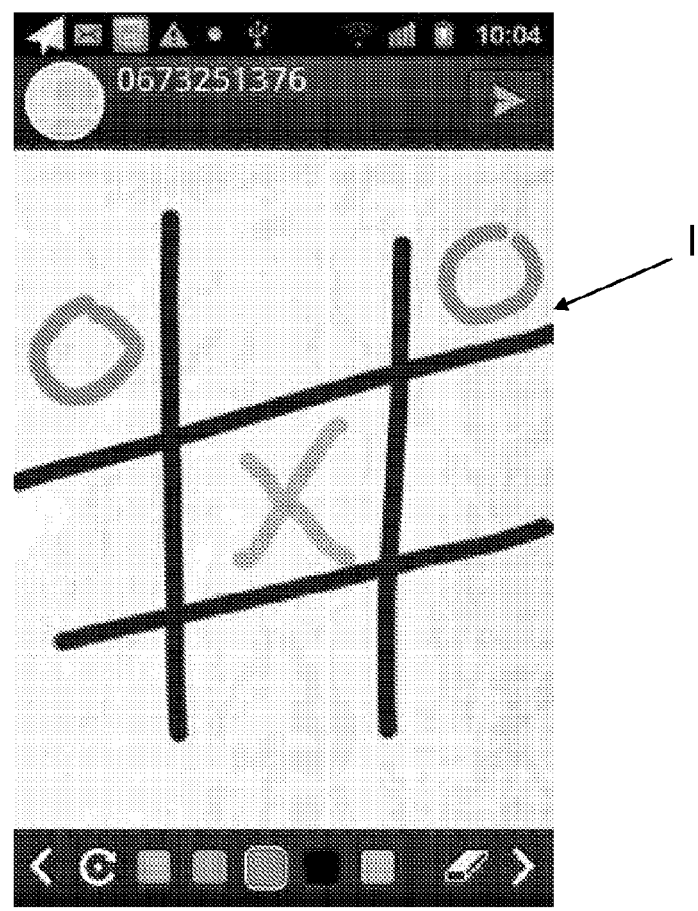
Figure 2C:
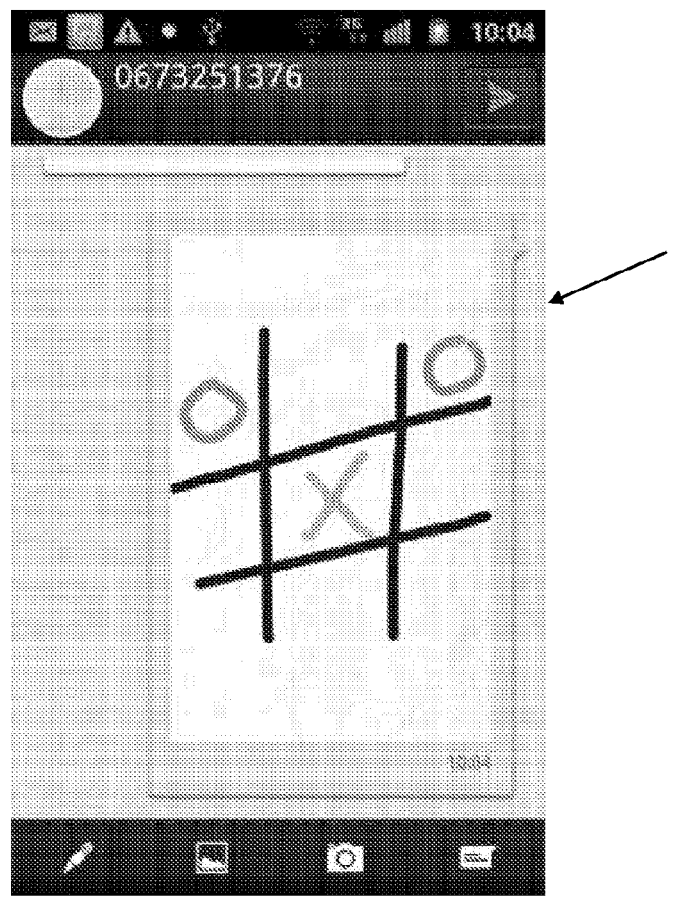

With reference to FIGS. 2a-2c, the method according to the invention implements an adapted user interface I, the interface being displayed on a screen 13 of the mobile terminal 1a.

Preferably, the screen 13 is a touch-sensitive screen for implementing the user interface I of the terminal. The actions of the user can then be direct touch actions on the display, which further facilitates the implementation of the method, as will be seen further on.

FIGS. 2a-2c illustrate the use of the method forming the subject of the invention for an exchange of MMS messages making it possible to play a game of noughts and crosses.

As can be seen in FIG. 2a, the interface I first allows the display of the image of the MMS as received. In the example illustrated, the image represents the board of the noughts and crosses game at a given stage of the round.

It should be noted that the interface I can allow the display in the form of a thread (i.e. in the form of a list in chronological order) of the drawings (images) included in the multimedia messages exchanged between the first and second terminals 1a, 1b.

If several items of content were included in an exchanged message, the interface I can provide their rendering in various ways (reading of an audio content by pressing a button, display in the thread of all the images/films etc.)

Apart from the usual buttons of an MMS message management interface ("new message", "select image", "take photo" etc.) the interface I offers access to a "draw" mode, which can be seen in FIG. 2b, by pressing a button, or directly on the image received in the case of a touch-sensitive screen 13.

This draw mode allows the modification of the image in a user interface I according to actions of a user. The term "action of the user" is understood to mean any command made on input means of the terminal 1a (for example a keyboard, and advantageously the screen 13 itself if it is touch-sensitive) with the aim of deliberately modifying the image, and not simple image processing that the user triggers indirectly. By way of example, the modifications can include drawing on the image, the coloring-in of part of the image, the addition of text, patterns, shapes, the erasing of part of the image etc. It will be understood that each action executed by the user is consciously done with the intention of obtaining a modification desired by him or her.

Thus, the drawing mode advantageously corresponds to a mode wherein the user interface I includes graphics editing tools for the implementation of the aforementioned image modification step (b), the image being displayed on the user interface I in real time while it is being modified.

The graphics editing tools can be of any kind, for example in FIG. 2b it is possible to see by way of example, on the lower part of the screen, an "eraser" tool (in the form of an action button) which when active makes it possible to erase part of the image by moving a finger over this part, and "color" tools (also in the form of action buttons) which allows the user to digitally select a color to apply it to the image in the manner of a paintbrush.

In FIG. 2b, an action button (in the middle of the lower bar of the interface) is active which allows the user to use the "color red" tool, for example, to draw a circle in the top right-hand box. In the case of a touch-sensitive screen 13, the fingers acts like a pencil for quick and precise modification of the image.

The real-time display allows the user to track the evolution of the image as desired, and make corrections easily.

To create an audio content, a specific action button on the interface can allow the user to launch an audio recording, via suitable means of the mobile terminal 1a such as a microphone, which recording, if it is validated by the user, can then be concatenated to the received audio content, so as to obtain the modified content. The same principle can apply to videos. It should be noted that the interface I can for example propose several screens (with specific tools), each screen being adapted to one type of content.

Once the modifications desired by the user have been accomplished, another button of the interface allows him or her to trigger the sending of the MMS message including the modified drawing (or other content) (the "second multimedia message" defined above) to the second terminal 1b, the user of which, in turn, will be able to modify the received drawing and send it back in a third multimedia message, and so on.

Terminal

As explained above, according to a second aspect, the invention relates to a mobile terminal 1a for implementing the method for exchanging multimedia messages according to the invention.

This mobile terminal 1a is thus, as explained above in relation to FIG. 1, connected to a second mobile terminal 1b via the communication network 20, the terminal 1a comprising a data processing module 11 such as a processor, and an advantageously touch-sensitive screen 13.

The data processing module 11 is thus configured to:
receive from the network 20 a first multimedia message emitted by the second terminal 1b the first multimedia message comprising (at least) one content;
render and modify the content in a user interface I according to the actions of a user (the interface I is displayed on the screen 13, and in the case of an image content if the screen is touch-sensitive the actions of the user are directly implemented on the image as displayed);
send to the second terminal 1b a second multimedia message comprising said modified content.

Note that the processing module 11 can be configured according to the invention directly at the terminal 1a design stage (native configuration), or configured subsequently, for example by installing the terminal in a specific application according to the invention, this specific application possibly replacing a native SMS/MMS application.

Advantageously, the second terminal 1b includes a data processing module 11 similarly configured, so as to allow an alternative implementation of the method according to the invention on each of the terminals 1a and 1b for a continuous exchange of MMSs that is effective and intuitive.

Computer Program Product

As explained above, the invention also relates to a computer program product comprising code instructions for the execution, by a data processing module of a communication terminal (the data processing module 11 of a first mobile terminal 1a, as well as, where applicable, that of a second terminal 1b), of a method according to the invention for exchanging multimedia messages between a first mobile terminal 1a and a second mobile terminal 1b connected to a communication network 20. The invention also relates to storage means readable via an item of IT equipment (for example a memory 12 of one of the terminals 1a, 1b) on which this computer program product is stored.

The invention claimed is:

1. A method for exchanging Multimedia Message Service type multimedia messages between a first mobile terminal and a second mobile terminal connected to a communication network, the method comprising the implementation, by a data processor of the first terminal, of a process comprising:
receiving from the network a first multimedia message of Multimedia Message Service type as defined by 3GPP emitted by the second terminal, the first multimedia message comprising at least one content, wherein at least one content is an image;
rendering the at least one content on the first terminal;
modification of the at least one content in a user interface on the first terminal according to the actions of a user to generate modified content; and
sending of a second multimedia message of Multimedia Message Service type as defined by 3GPP comprising the modified content to the second terminal,
wherein the user interface allows the display of the images included in the multimedia messages exchanged between the first and second terminals.

2. The method according to claim 1, wherein the user interface comprises graphics editing tools for implementing said rendering and modification, the image being displayed on the user interface in real time while it is being modified.

3. The method according to claim 1, wherein said first terminal comprises a touch-sensitive screen for implementing said user interface of the first terminal, said user actions being touch actions.

4. The method according to claim 1, wherein the transmission of multimedia messages over the network is implemented in accordance with Rich Communication Services specifications.

5. A mobile terminal connected to a second mobile terminal via a communication network, the terminal comprising a data processor configured to:

receive from the network a first multimedia, message of Multimedia Message Service type as defined by 3GPP emitted by the second terminal, the first multimedia message comprising at least one content, wherein at least one content is an image;

render the at least one content on the first terminal;

modify the at least one content in a user interface on the first terminal according to the actions of a user to generate modified content; and send to the second terminal a second multimedia message of Multimedia Message Service type as defined by 3GPP comprising said modified content, wherein the user interface allows the of the images included in the multimedia messages exchanged between the first and second terminals.

6. A mobile terminal having stored thereon instructions for performing a method for exchanging Multimedia Message Service type multimedia messages between a first mobile terminal and a second mobile terminal connected to a communication network when the instructions are executed by a processor wherein the method is implemented by a data processor of the first terminal and comprises:

reception from the network of a first multimedia message of Multimedia Message Service type as defined by 3GPP emitted by the second terminal, the first multimedia message comprising at least one content, wherein at least one content is an image;

rendering the at least one content on the first terminal;

modification of the at least one content in a user interface on the first terminal according to the actions of a user to generate modified content; and sending of a second multimedia message of Multimedia Message Service type as defined by 3GPP comprising the modified content to the second terminal, wherein the user interface allows the display of the images included in the multimedia messages exchanged between the first and second terminals.

7. A non-transitory computer readable storage having stored thereon instructions for performing a method for exchanging Multimedia Message Service type multimedia messages between a first mobile terminal and a second mobile terminal connected to a communication network when the instructions are executed by a processor, wherein the method is implemented by a data processor of the first terminal and comprises;

reception from the network of a first multimedia message of Multimedia Mess age Service type as defined by 3GPP emitted by the second terminal, the first multimedia message comprising at least one content, wherein at least one content is an image;

rendering the at least one content on the first terminal;

modification of the at least one content in a user interface on the first terminal according to the actions of a user to generate modified content; and sending of a second multimedia message of Multimedia Message Service type as defined by 3GPP comprising the modified content to the second terminal.

\* \* \* \* \*

UNITED STATES PATENT AND TRADEMARK OFFICE
CERTIFICATE OF CORRECTION

Page 1 of 1

PATENT NO.         : 10,798,036 B2
APPLICATION NO.    : 14/779775
DATED              : October 6, 2020
INVENTOR(S)        : Emmanuel Le Huerou It is certified that error appears in the above-identified patent and that said Letters Patent is hereby corrected as shown below:

In the Claims

In Column 7, Line 8, Claim 5, delete "multimedia," and insert --multimedia--.

In Column 7, Line 21, Claim 5, delete "the" and insert --the display--.

In Column 8, Line 19 (approx.), Claim 7, delete "comprises;" and insert --comprises:--.

In Column 8, Line 22 (approx.), Claim 7, delete "Mess age" and insert --Message--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*